W. CREELY.
AIR MOTOR.
APPLICATION FILED AUG. 18, 1911.

1,044,995.

Patented Nov. 19, 1912.
2 SHEETS—SHEET 1.

WITNESSES:
Jos. Rawley
Christine A. Braidel.

INVENTOR
William Creely
BY
Geo. B. Willcox ATTORNEY

W. CREELY.
AIR MOTOR.
APPLICATION FILED AUG. 18, 1911.

1,044,995.

Patented Nov. 19, 1912.

2 SHEETS—SHEET 2.

WITNESSES:
Jno. Rawley
Christine A. Braidel

INVENTOR
William Creely.
BY
Geo. B. Willcox ATTORNEY

UNITED STATES PATENT OFFICE.

WILLIAM CREELY, OF BAY CITY, MICHIGAN, ASSIGNOR OF ONE-FOURTH TO FRED LENNOX, OF ALPENA, MICHIGAN.

AIR-MOTOR.

1,044,995.  Specification of Letters Patent.  Patented Nov. 19, 1912.

Application filed August 18, 1911. Serial No. 644,808.

*To all whom it may concern:*

Be it known that I, WILLIAM CREELY, a citizen of the United States, residing at Bay City, in the county of Bay and State of Michigan, have invented certain new and useful Improvements in Air-Motors; and I do hereby declare the following to be a full, clear, and exact description of the invention, such as will enable others skilled in the art to which it appertains to make and use the same.

This invention relates to air motors for propelling vehicles, and pertains particularly to such motors as applied to the propelling of street cars, motor trucks, and vehicles of like nature.

The improvement consists in means for utilizing a part of the momentum of the car when going down-grade, for pumping air under pressure into a tank, from which the air may be subsequently taken to drive the motor.

A further object is to provide means for compressing air to a greater pressure than that required for driving the motor, and storing the air so compressed, and means for drawing the highly compressed air from its storage tank, reducing its pressure and delivering it to the working pressure tank, from which the motor derives its supply.

A further object is to provide means for quickly increasing or decreasing the speed of the car, or for reversing its motion, and means for quickly disconnecting the engine from the traction wheels for the purpose of throwing the engine out of gear.

My invention also comprises means for heating the air in the working pressure tank to thereby increase its expansive properties.

With these and certain other objects in view, which will appear later in the specification, my invention consists in the devices described and claimed.

Figure 1:
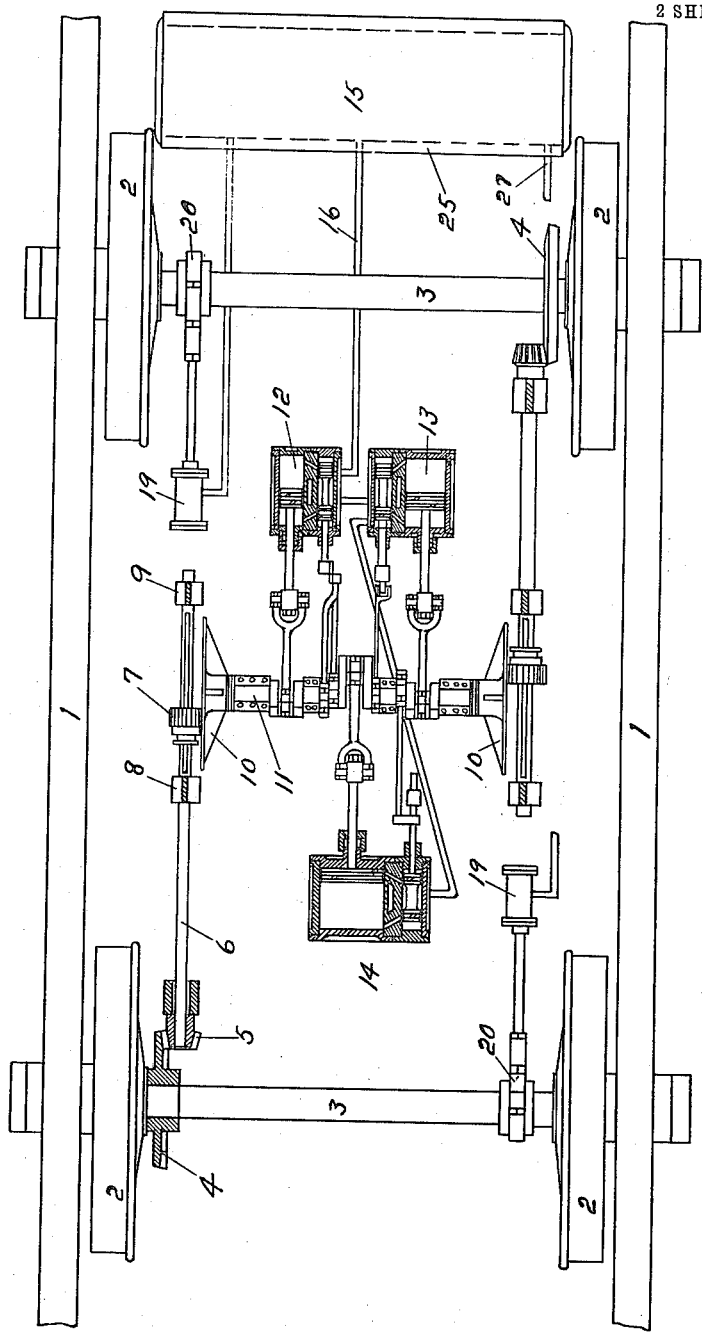
Figure 2:
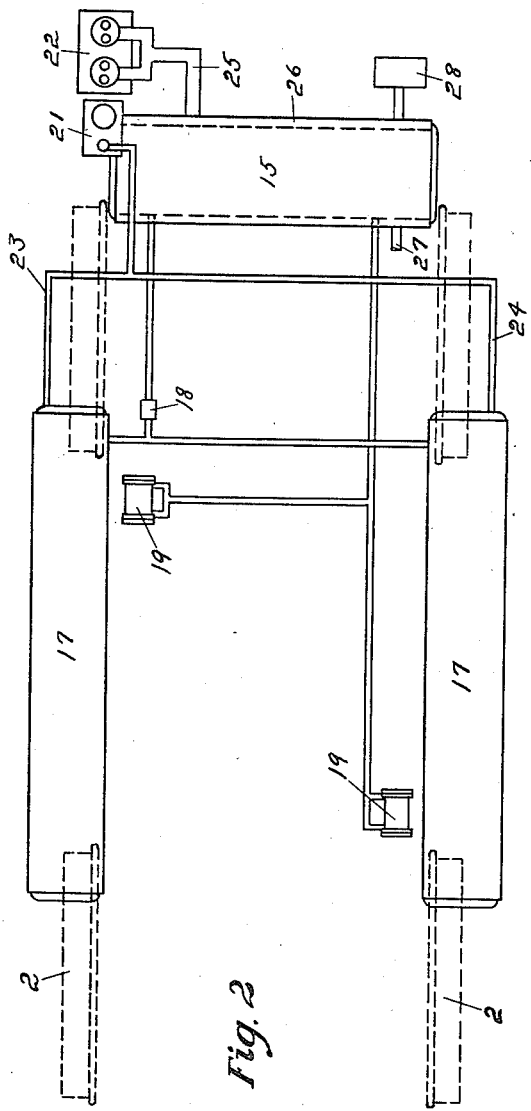
Figure 3:
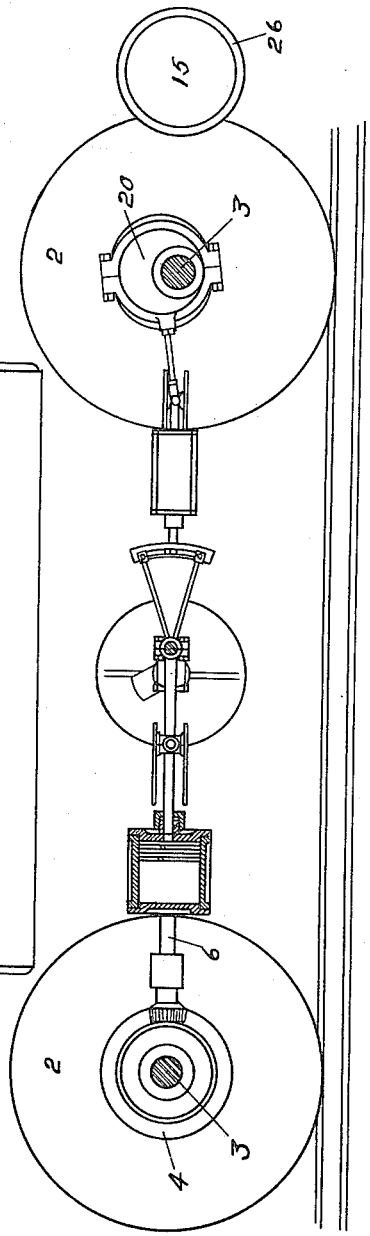

In the accompanying drawings, forming a part of the specification, Figure 1 is a part sectional top plan view of a car with my improved driving mechanism attached, the platform of the car being omitted; Fig. 2 is a diagrammatic view showing the arrangement of the air tanks and compressors; Fig. 3 is a side elevation partly in section, showing the relative arrangement of the tanks and driving mechanism.

In the drawings, 1 represents the frame of a car, 2 the car wheels, and 3 the axle.

4 is a beveled gear fixed to the axle, and 5 is a beveled pinion meshing with gear 4.

6 is a pinion shaft carrying a paper friction pinion 7 feathered to shaft 6 and adapted to be slid along the shaft by any suitable mechanism, not shown.

8 and 9 are adjustable boxes by which pinion 7 may be moved toward or from a flat face friction wheel 10 secured to the end of a crank shaft 11. The crank shaft is driven by a triple expansion air engine comprising a high pressure cylinder and valve 12, intermediate cylinder 13, and low pressure cylinder 14.

By sliding pinion 7 along its shaft, the speed of shaft 6 can be varied or its direction of rotation reversed, and the shaft 6 may also be thrown into or out of operation by shifting the boxes 8 and 9, thereby connecting or disconnecting the engine from the wheels 2.

The high pressure cylinder 12 receives its supply of air under working pressure from the tank 15, which I designate the working pressure tank, being connected thereto by a pipe 16. The working pressure tank receives its supply of air from either of two sources, i. e., from storage tanks 17 through a suitable pipe having a reducing valve 18, or from air compressors 19, 19, which are driven from the axles 3 by means of eccentrics 20, each of the compressors being piped to the working pressure tank 15. Storage tanks 17 receive their supply of air, which is at much higher pressure than the air in the working pressure tank 15, from a two-stage air compressor 21, which is driven from a suitable gas engine 22, the air compressor being connected to the tanks 17 by means of pipes 23 and 24. The exhaust from engine 22 passes through the exhaust pipe 25 into a cylindrical jacket 26 that surrounds the working pressure tank 15, and the jacket exhausts into the atmosphere through a pipe 27.

28 is an independent heater of any suitable construction, adapted to heat the air contained in tank 15, independent of the exhaust of engine 22.

The operation of the machine is as follows: The storage tanks 17 are first charged with air at high pressure from any suitable source, as an independent charging station, or if desired, they may be charged by means of the two-stage compressor 21 and the gasolene engine 22. Air is drawn from tanks 17 through the reducing valve 18 and received at a lower working pressure into the tank 15. When the car is started, air at working pressure is drawn from tank 15 to high pressure cylinder 12, where it is partly expanded, thence through intermediate cylinder 13 and low pressure cylinder 14, from which it is exhausted to the atmosphere. Cylinders 12, 13 and 14 drive the friction wheels 10 and the pinion 7, which in turn drives the wheels 2. As the car proceeds, the engine 22 and compressor 21 deliver sufficient air to storage tanks 17 to maintain the proper pressure therein. Exhaust from engine 22 passes through pipe 25 and fills cylindrical jacket 26, imparting a large proportion of its heat to the air in working pressure tank 15, thereby increasing the expansive force of the air in the tank and increasing its capacity for doing work in the engine cylinders. If the heat of the exhaust through pipe 25 is not sufficient to maintain the proper temperature in tank 15, the auxiliary heater 28 may be employed to raise the temperature to the required degree.

The heater 28 may be of any suitable type, the details of the heater forming no part of my present invention.

On down-grade the surplus momentum of the car is converted into stored-up energy in the manner which will now be explained.

The air compressors 19, driven from the axles 3 by means of eccentrics 20, are piped to the working pressure tank 15, as shown in Fig. 1. When descending a grade, pinion 7 is thrown out of contact with friction wheel 10, thereby disconnecting the engine from the wheels 2. The air supply to the engine is shut off and the air compressors 19 are thrown into communication with the working pressure tank 15. The movement of the car and rotation of the wheels 2 operate the compressors 19 and supply the tank 15 with additional air at working pressure. When the bottom of the grade is reached, the engine is again started and the compressors 19 are disconnected from the tank 15.

It will thus be seen that I have produced an air motor comprising means for compressing air to high pressure and storing it, reducing the pressure and delivering the air to a receiver at lower pressure, and drawing the air from this receiver into an engine. It will also be seen that I utilize the heat of the exhaust from the air compressor engine to preheat the air in the receiver and thereby increase its expansive property. I also provide means for absorbing the surplus momentum of the car when going down-grade or when stopping, and converting the energy so absorbed into the form of air under pressure to be later utilized in driving the car.

Having described my invention, what I claim and desire to secure by Letters Patent, is:—

In combination with a vehicle having axles, a tank for storing air at working pressure, a jacket surrounding said tank, an air compressor, a gas engine adapted to drive said air compressor, an exhaust pipe connecting the exhaust of said gas engine to said jacket, an exhaust outlet to said jacket, a storage tank adapted to store air at a pressure higher than working pressure, pipes connecting said air compressor to said high pressure tank, a pipe connecting the high pressure tank to said working pressure tank, a reducing valve located in said last-mentioned pipe, a compressed air motor connected to said working pressure tank, and traction devices actuated by said motor, together with an air compressor operatively connected to an axle of the vehicle, and a pipe connecting said compressor with said working pressure tank.

In testimony whereof, I affix my signature in presence of two witnesses.

WILLIAM CREELY.

Witnesses:
 CHRISTINE A. BRAIDEL,
 GEO. W. SMITH.